US011495033B2

(12) United States Patent
Wang (10) Patent No.: US 11,495,033 B2
(45) Date of Patent: Nov. 8, 2022

(54) METHOD AND APPARATUS FOR CONTROLLING UNMANNED VEHICLE, ELECTRONIC DEVICE AND STORAGE MEDIUM (71) Applicant: BAIDU ONLINE NETWORK TECHNOLOGY (BEIJING) CO., LTD., Beijing (CN)

(72) Inventor: Ya Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 443 days.

(21) Appl. No.: 16/668,450

(22) Filed: Oct. 30, 2019

(65) Prior Publication Data
US 2020/0134338 A1   Apr. 30, 2020

(30) Foreign Application Priority Data
Oct. 30, 2018   (CN) .......................... 201811280579.6

(51) Int. Cl.
*G06K 9/00*   (2022.01)
*G06V 20/59*   (2022.01)
(Continued)

(52) U.S. Cl.
CPC .......... *G06V 20/597* (2022.01); *B64C 39/024* (2013.01); *G05D 1/0088* (2013.01);
(Continued)

(58) Field of Classification Search
CPC .. G06V 20/597; G06V 40/174; B64C 39/024; B64C 2201/12; G05D 1/0088;
(Continued)

(56) References Cited

U.S. PATENT DOCUMENTS 9,958,870 B1 * 5/2018 Graybill ................... G05D 1/02
9,975,483 B1 * 5/2018 Ramaswamy ......... B60Q 11/00
(Continued)

FOREIGN PATENT DOCUMENTS

| CN | 107357194 A | 11/2017 |
|---|---|---|
| CN | 107531236 A | 1/2018 |
| JP | 2017188127 A | 10/2017 |

OTHER PUBLICATIONS

Kim Snaith, "This Kickstarter Wants You to Use Emojis Instead of Hand Gestures While You Drive", Gidzmodo, Jan. 15, 2018, 4 pages.
(Continued)

*Primary Examiner* — Dhaval V Patel
(74) *Attorney, Agent, or Firm* — Fay Sharpe LLP (57) ABSTRACT

Embodiments of the present disclosure provides a method and an apparatus for controlling an unmanned vehicle, an electronic device and a computer readable storage medium. In this method, the computer device of the unmanned vehicle determines occurrence of an event associated with physical discomfort of a passenger in the vehicle. The computer device also determines a severity degree of the physical discomfort of the passenger. The computer device further controls a driving action of the vehicle based on the determined severity degree.

15 Claims, 6 Drawing Sheets

(51) Int. Cl.
  *B64C 39/02* (2006.01)
  *G05D 1/00* (2006.01)
  *G05D 1/10* (2006.01)
  *G10L 15/20* (2006.01)
  *G06V 40/16* (2022.01)

(52) U.S. Cl.
  CPC ........... *G05D 1/101* (2013.01); *G06V 40/174* (2022.01); *G10L 15/20* (2013.01); *B64C 2201/12* (2013.01)

(58) Field of Classification Search
  CPC ........ G05D 1/101; G05D 1/021; G10L 15/20; B60Q 1/2611; B60Q 1/46; B60Q 1/50; B60Q 1/503; B60Q 5/005; B60W 50/14; B60W 2040/0818; B60W 2420/42; B60W 2540/21; B60W 2540/221; B60W 60/001; B60K 28/06; G06F 2203/011; G06F 3/011; G06F 3/012; G06F 3/0304
  See application file for complete search history.

(56) References Cited

U.S. PATENT DOCUMENTS

| | | | |
|---|---|---|---|
| 2015/0379989 A1* | 12/2015 | Balasubramanian | .................... G06Q 30/0267 704/233 |
| 2016/0264131 A1 | 9/2016 | Chan et al. | |
| 2017/0242428 A1 | 8/2017 | Pal et al. | |
| 2017/0291544 A1 | 10/2017 | Ishihara et al. | |
| 2017/0330044 A1* | 11/2017 | Telpaz | ................. G05D 1/0088 |
| 2018/0120837 A1* | 5/2018 | Regmi | ................. A61B 5/0205 |
| 2020/0082287 A1* | 3/2020 | Beaurepaire | ........... G06N 5/047 |

OTHER PUBLICATIONS

Extended European Search Report for EP Application No. 19206213.1, dated Mar. 12, 2020, 9 pages.

Office Action for Japanese Application No. 201811280579.6, dated Apr. 21, 2021, 8 pages.

Office Action for Chinese Application No. 201811280579.6, dated Mar. 11, 2022, 10 pages.

* cited by examiner

METHOD AND APPARATUS FOR CONTROLLING UNMANNED VEHICLE, ELECTRONIC DEVICE AND STORAGE MEDIUM

CROSS REFERENCE TO RELATED APPLICATIONS

This application is based on and claims priority to Chinese patent application Serial No. 201811280579.6, filed on Oct. 30, 2018, the entire contents of which are incorporated herein by reference.

FIELD

The present disclosure relates to a field of information processing, and more particularly, to a method and an apparatus for controlling an unmanned vehicle, an electronic device and a computer readable storage medium.

BACKGROUND

In daily travel, passengers may experience discomfort symptoms such as motion sickness due to personal physical condition and other reasons. In other cases, they may also have some sudden special physical conditions, such as sudden diseases and physical discomfort caused by emergencies. In the case of human driving vehicles, the driver will often take some responsive measures, such as pull over, help to call the rescue phone, or get out for help, and so on.

However, in an unmanned vehicle, there will be no "driver" to help passengers with these measures. Therefore, the conventional unmanned vehicle lacks the ability to deal with passengers' emergencies, which results in passengers' safety being not guaranteed.

SUMMARY

The present disclosure provides a method and an apparatus for controlling an unmanned vehicle, an electronic device and a computer readable storage medium.

According to a first aspect of the present disclosure, a method for controlling an unmanned vehicle is provided. The method includes: determining occurrence of an event associated with physical discomfort of a passenger in the vehicle. The method further includes: determining a severity degree of the physical discomfort of the passenger. The method further includes: controlling a driving action of the vehicle based on the determined severity degree.

According to a second aspect of the present disclosure, an apparatus for controlling a vehicle is provided. The apparatus includes a processor and a memory. The memory is configured to store instructions executable by the processor. The processor is configured to run a program corresponding to the instructions by reading the instructions stored in the memory, so as to perform the method according to the first aspect of the present disclosure.

According to a third aspect of the present disclosure, an electronic device is provided. The electronic device includes one or more processors and a storage device configured to store one or more programs. When the one or more programs are executed by the one or more processors, the one or more processors are caused to implement the method of the first aspect.

According to a fourth aspect of the present disclosure, a computer readable storage medium is provided. The readable storage medium is configured to store a computer program. When the computer program is executed by a processor, the method of the first aspect is implemented.

It should be understood that the contents described in the section of summary are not intended to limit key or important features of embodiments of the present disclosure or to limit the scope of the present disclosure. Other features of the present disclosure will be easily understood based on the following description.

BRIEF DESCRIPTION OF THE DRAWINGS

The above and other objectives, features and advantages of embodiments of the present disclosure will be readily understood by reading the detailed description below with reference to the accompanying drawings. In the accompanying drawings, several embodiments of the present disclosure are shown in an exemplary rather than restrictive manner.

Throughout all the drawings, the same or similar reference numerals are used to represent the same or similar components.

DETAILED DESCRIPTION

The principles and spirit of the present disclosure are described below with reference to a number of exemplary embodiments shown in the attached drawings. It should be understood that these specific embodiments are described only to enable those skilled in the art to better understand and implement the present disclosure, and not to restrict the scope of the present disclosure in any way.

As mentioned above, when a passenger in an unmanned vehicle has sudden physical discomfort, there is no "driver" to assist the passenger to take necessary measures to alleviate or resolve the sudden physical discomfort. In view of the above and other potential problems existing in the conventional schemes, embodiments of the present disclosure provide a method and an apparatus for controlling an unmanned vehicle, an electronic device and a computer readable storage medium.

With the technical solutions of embodiments of the present disclosure, a physical discomfort and a severity degree thereof of the passenger in the unmanned vehicle can be identified autonomously, and corresponding driving actions of the vehicle are performed according to different severity degrees of the physical discomfort. In this way, when the passenger in the unmanned vehicle experiences the physical discomfort, he/she can get effective relief or treatment in time, thereby improving the handling ability and riding security of the passenger in the unmanned vehicle when experiencing sudden events. Moreover, with the technical solutions of embodiments of the present disclosure, different alert messages may be provided via a display screen, a headlight, a light strip, a horn, and the like of the vehicle, to be suitable for message informing outside the vehicle under different severity degrees of sudden events. In the following, embodiments of the present disclosure will be described in detail with reference to the drawings.

Figure 1:
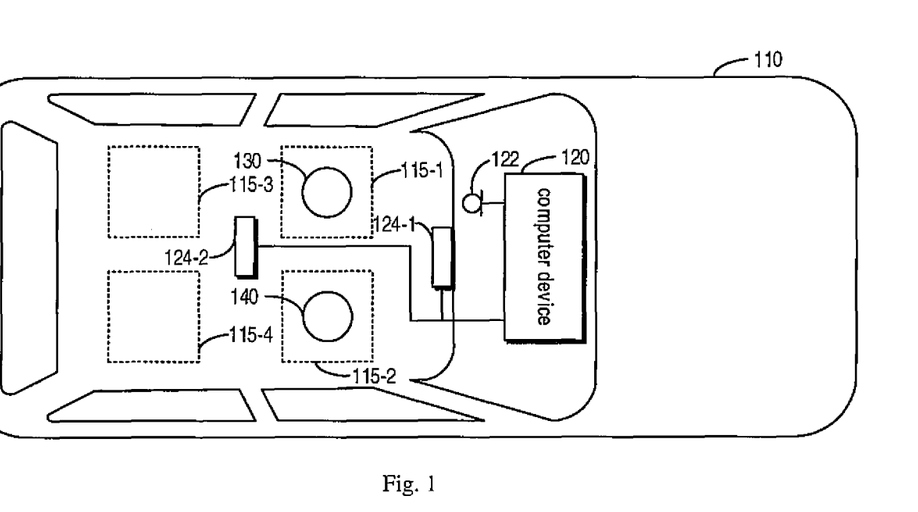
FIG. 1 is a schematic diagram of an exemplary scenario in which some embodiments of the present disclosure can be applied.

FIG. 1 illustrates a schematic diagram of an exemplary scenario 100 in which some embodiments of the present disclosure can be applied. As illustrated in FIG. 1, the exemplary scenario 100 includes an unmanned vehicle or an automatic driving vehicle 110. In some embodiments, the vehicle 100 may have an automatic driving capability of L5 level. For example, the vehicle 100 may autonomously realize pulling over, which includes operations such as identifying parking positions, selecting a suitable position for pulling over, and opening the double flash based on traffic laws. For another example, the vehicle 110 may accurately understand the traffic law for the present road scenario, for example, whether parking is allowed at the present roadside. For yet another example, the vehicle 100 can accurately identify elements of the surrounding environment, such as vehicles and pedestrians (including electric motorcars and bicycles) on the road. In other embodiments, the vehicle 100 may also include any motor vehicle or non-motor vehicle without driving of a driver.

The exemplary scenario 100 further includes passengers (occupants) 130 and 140. In the example depicted in FIG. 1, the passengers 130 and 140 sits in front seats 115-1 and 115-2 of the vehicle respectively, and no passengers sit in back seats 115-3 and 115-4 of the vehicle. It is to be understood that, although the exemplary scenario of FIG. 1 shows that the vehicle 100 has a specific number of seats and passengers and the passengers sit in specific seats, these specific number and specific seats are merely exemplary, and are not intended to limit the scope of the present disclosure in any way. In other embodiments, the vehicle 110 may have more or less seats and passengers, and the passengers may sit in other seats. In the followings, without loss of generality, the passenger 130 is taken as an example to describe embodiments of the present disclosure. However, it is to be understood that, embodiments of the present disclosure are equivalently applicable to the passenger 140 and any other passenger in the vehicle 110.

As illustrated in FIG. 1, the vehicle 110 may include a computer device 120 to control driving of the vehicle 110, thereby realizing automatic driving of the vehicle 110 without human intervention. It is to be understood, although FIG. 1 illustrates that there are a specific number of computer device 120 and the computer device 120 is at a specific position in the vehicle 110, these specific number and specific position are merely exemplary, and are not intended to limit the scope of the present disclosure in any way. In other embodiments, the vehicle 110 may have more or less computer devices, and the computer devices may be disposed at nay other suitable positions in the vehicle 110.

As mentioned above, when the passenger 130 rides in the unmanned vehicle 100, he/she may experience physical discomfort. For example, the passenger 130 may experience symptoms of motion sickness, physical discomfort caused by riding, sudden diseases, and the like. Therefore, in order to take corresponding actions when the passenger experience the physical discomfort, the computer device 120 of the vehicle 110 needs to first identify or detect that the passenger 130 is in a state of physical discomfort.

For example, the vehicle 110 may determine a physical condition of the passenger 130 according to a behavior of the passenger 130 in the vehicle 110. For example, a facial expression or a body movement of the passenger 130 may reflect that the passenger 130 is in the state of physical discomfort. For this, a front image capturing device (for example, camera) 124-1 and a back image capturing device 124-2 may be disposed in the vehicle 110, which may be collectively referred to as image capturing devices 124. The image capturing device 124 may be configured to shoot an image or a video of the passenger 130, to monitor a behavior change of the passenger 130. The image capturing device 124 may be communicatively connected to or coupled to the computer device 120, such that the image capturing device 124 transfers the image or video containing the passenger 130 to the computer device 120, and the computer device 120 may control an operation of the image capturing device 124.

It is to be understood, although FIG. 1 shows that there are a specific number of image capturing devices 124 and the image capturing devices are disposed at specific positions in the vehicle 110, these specific number and specific positions are merely exemplary, and are not intended to limit the scope of the present disclosure in any way. In other embodiments, the vehicle 110 may have more or less image capturing devices, and the image capturing devices may be disposed at any other suitable positions in the vehicle.

In addition, the vehicle 100 may further determine the physical condition of the passenger 130 according to a voice issued actively by the passenger 130 in the vehicle 110. For example, when the passenger 130 feels unwell, he/she may speak to the vehicle 110 to clearly express that he/she is not feeling well. For this, a microphone 122 may be disposed in the vehicle 110, and configured to collect sounds issued by the passenger 130. The microphone 122 may be communicatively connected to or coupled to the computer device 120, such that the microphone 122 transfers the voice signal of the passenger 130 to the computer device 120 for recognition, and the computer device 120 may control an operation of the microphone 122.

In some embodiments, the microphone 122 may be one separate microphone. Alternatively, the microphone 122 may also be implemented in a form of microphone array. The microphone array is advantageous in some cases. For example, the passenger 130 may be far away from the microphone 122, and there may be a lot of noises, multipath reflection and reverberation in actual environment of the vehicle 110. In this case, the microphone array may better pick up voice information of the passenger 130, improving a voice recognition rate.

Further, the physical discomfort of the passenger 130 may have different severity degrees, for example, the passenger 130 may experience little discomfort, moderate discomfort, or severe discomfort. Corresponding to different levels of discomfort of the passenger 130, it is advantageous that the vehicle 110 takes different measures. Therefore, after detecting that the passenger 130 has physical discomfort, the vehicle 110 may determine the severity degree of the physical discomfort of the passenger 130. Based on the determined severity degree, the computer device 120 may control the vehicle 110 to execute targeted driving action.

In this way, for the passenger 130 having little discomfort, the vehicle 110 may relieve the mild discomfort while affecting a journey of the passenger 130 to a lower extent; and for the passenger 130 having the moderate or severe discomfort, the vehicle 110 may take timely action to resolve or treat the passenger 130. In the following, operations associated with embodiments of the present disclosure will be described in more detail with reference to FIG. 2.

Figure 2:
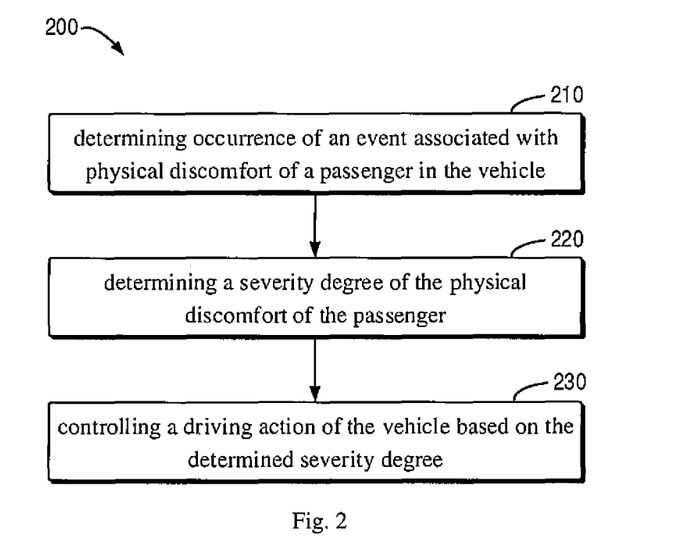
FIG. 2 is a schematic flowchart of a method for controlling an unmanned vehicle according to an embodiment of the present disclosure.

FIG. 2 illustrates a schematic flowchart of a method 200 for controlling an unmanned vehicle according to embodiments of the present disclosure. In some embodiments, the method 200 may be implemented by the computer device 120 of FIG. 1, for example, by a processor or a processing unit of the computer device 120. In other embodiments, all or a part of the method 200 may be implemented by a computing device separate from the computer device 120, or may be implemented by other units in the exemplary scenario 100. For the sake of discussion, the method 200 may be described in combination with FIG. 1, in which the method 200 is executed by the computer device 120.

At block 210, the computer device 120 of the vehicle 11o determines occurrence of an event associated with physical discomfort of the passenger 130 in the vehicle 110. In some embodiments, the computer device 120 may determine the physical discomfort of the passenger 130 according to the behavior of the passenger 130. For example, the computer 120 may obtain an image containing the passenger 130 via the image capturing device 124, in which the image may be determined from pictures shot for the passenger 130 or frames of a video streaming shot for the passenger 130. Then, the computer device 120 may determine the behavior of the passenger 130 based on the image. In some embodiments, the behavior of the passenger 130 includes a facial expression, a body movement, or any other similar physical behavior of the passenger.

When the determined behavior matches a predetermined physical discomfort behavior, the computer device 120 may determine the occurrence of an event associated with the physical discomfort of the passenger 130 in the vehicle 110. For example, if the behavior of the passenger 130 is the facial expression, the predetermined physical discomfort behavior may include looking pale, frown, closing eyes, opening the mouth to moan, twisted expression, and the like. When the computer device 120 identifies such facial expression of the passenger 130, it may determine that the passenger 130 has physical discomfort. For another example, if the behavior of the passenger 130 is the body movement, the predetermined physical discomfort behavior may include fidgeting, covering the mouth and retching, turning over the body, huddling, stiffness of the body, and the like. When the computer device identifies such body movement of the passenger 130, it may also determine that the passenger 130 has physical discomfort. Similarly, for other body behaviors of the passenger 130, corresponding physical discomfort behaviors may be set in advance, such that the computer device 120 may determine that the passenger 130 has physical discomfort when the identified body behavior matches the predetermined behavior. In this way, the vehicle 110 may detect the physical abnormalities of the passenger by means of camera devices which are cheap and easy to install, avoiding disposing expensive health monitoring devices on the unmanned vehicle.

In other embodiments, the computer device 120 may also determine the physical discomfort of the passenger 130 based on the voice issued by the passenger 130. For example, the computer device 120 may collect the voice of the passenger 130 by the microphone 122, and then identify a keyword in the voice of the passenger 130. If a word expressing the physical discomfort is detected in the keyword, the computer device 120 may determine the occurrence of the event associated with the physical discomfort of the passenger 130. As an example, when the passenger 130 feels the physical discomfort, the passenger 130 may speak "I feel unwell" to the vehicle 110, to clearly express his physical discomfort. In this case, the computer device 120 may identify the keyword "unwell", to determine the physical discomfort of the passenger 130. In this way, the vehicle 110 may detect the physical abnormalities of the passenger by means of the voice collecting device which is cheap and easy to install, avoiding disposing the expensive health monitoring device on the unmanned vehicle. In addition, since in this manner, it is the passenger's own expression of physical discomfort, it is accurate and correct.

In other embodiments, the computer device 120 may also determine the physical discomfort of the passenger 130 in any other suitable manners. For example, the vehicle 110 may be equipped with the health monitoring device (for example, a thermometer, a sphygmomanometer, a cardiotachometer, a respiration meter, and the like), to monitor the health condition of the passenger 130 in real time. With these health monitoring devices, the computer device 120 may monitor the physical discomfort of the passenger 130. In addition, various manners for determining the physical discomfort of the passenger 130 described above may be combined.

At block 220, the computer device 120 of the vehicle 110 determines a severity degree of the physical discomfort of the passenger 130. In some embodiments, the severity degree of the physical discomfort of the passenger 130 may include little discomfort, moderate discomfort, and severe discomfort. In other embodiments, the severity degree may be divided into any suitable number of levels. The more levels the severity degree is divided into, the better the vehicle 110 handles with the emergency situation of the passenger 130. in addition, it is to be understood that, the computer device 120 may determine the degree of the physical discomfort of the passenger 130 in various manners.

In some embodiments, as described above, the computer device 120 may determine the physical discomfort of the passenger 130 when the behavior of the passenger 130 matches the predetermined physical discomfort behavior. In this case, the computer device 120 may further determine the level corresponding to the matched predetermined physical discomfort behavior. For example, the predetermined physical discomfort behavior of the passenger 130 may be divided to five levels (from level 1 to level 5), and each level may include several behaviors.

Exemplarily, in the scenario in which the behavior is the facial expression, looking pale may be level 1, frown may be level 2, closing eyes may be level 3, twisted expression may be level 4, and opening the mouth to moan may be level 5. In the scenario in which the behavior is the body movement, fidgeting may be level 1, covering the mouth and retching may be level 2, turning over the body may be level 3, huddling may be level 4, and stiffness of the body may be level 5. It is to be understood, the specific number of levels used herein may be exemplary, and are not intended to limit the scope of the present disclosure in any way. In other embodiments, the predetermined physical discomfort behavior of the passenger 130 may be divided into any suitable number of levels.

Then, based on the determined level corresponding to the predetermined physical discomfort behavior, the computer device 120 may determine the severity degree of the physical discomfort of the passenger 130. As an example, level 1 and level 2 may correspond to little discomfort, level 3 and level 4 may correspond to moderate discomfort, and level 5 may correspond to severe discomfort. In this way, the computer device 120 may determine the severity degree of the physical discomfort of the passenger more accurately. It is to be understood, the specific number of levels and specific number of severity degrees as well as the correspondence relationship therebetween are merely exemplary, and are not intended to limit the scope of the present disclosure in any way. In other embodiments, any suitable number of levels, any suitable number of severity degrees, and any suitable correspondence relationship therebetween may be used.

In other embodiments, as described above, the computer device 120 may also determine the physical discomfort of the passenger 130 based on the voice explicitly issued by the passenger 130. In this case, the computer device 120 may determine the adverb of degree in the words expressing the physical discomfort in the voice of the passenger 130. Based on the adverb of degree, the computer device 120 may determine the severity degree of the physical discomfort of the passenger 130. For example, when the passenger 130 experiences the physical discomfort, the passenger 130 may speak "I feel very unwell now." to the vehicle. In this case, the computer device 120 may determine the adverb of degree "very" expressing the physical discomfort in the voice issued by the passenger 130, so as to determine that the severity degree of the physical discomfort of the passenger 130 as severe discomfort. In this way, since the vehicle 110 obtains the severity degree of the physical discomfort expressed by the passenger, the severity degree is accurate and correct.

In other embodiments, the computer device 120 may also determine the severity degree of the physical discomfort of the passenger 130 in any other suitable manner. For example, as described above, the vehicle 110 may be equipped with the health monitoring devices, for monitoring the health condition of the passenger 130 in real time. If the computer device 120 monitors the physical discomfort of the passenger 130 via the health monitoring device, the computer device 120 may further determine the severity degree of the physical discomfort of the passenger 130 via the health monitoring device. In addition, the various manners for determining the degree of physical discomfort of the passenger 130 may be combined.

At block 230, the computer device 120 controls a driving action of the vehicle 110 based on the determined severity degree of physical discomfort of the passenger 130, to relieve or resolve the physical discomfort of the passenger 130. For example, when the passenger 130 merely experiences the little discomfort (for example, slight motion sickness, slight discomfort, etc.), the computer device 120 may control the vehicle 110 to slow down, such that the passenger 130 is in the state of smooth movement, thereby relieving the discomfort. In addition, in order to relieve the little discomfort of the passenger 130, the computer device 120 may lower windows of the vehicle for ventilation, or may adjust the air conditioner of the vehicle 110 to a suitable temperature, or the like.

For another example, when the passenger experiences the moderate physical discomfort (for example, severe motion sickness, moderate discomfort, mild sudden disease, and the like), the computer device 120 may control the vehicle 110 to pull over, such that the passenger 130 may leave the moving vehicle, to resolve the moderate discomfort. If the moderate discomfort is not cased by riding in the vehicle, leaving the vehicle 110 may facilitate the passenger 130 to take actions to resolve the physical discomfort. When performing the operation of pulling over, the computer device 120 may control the vehicle 110 to first slow down, and change to the rightmost lane at the appropriate time, so as to realize pulling over.

For yet another example, when the passenger 130 experiences the severe physical discomfort (for example, severe sudden disease), the computer device 120 may control the vehicle 110 to drive to the intended destination, such that the passenger 130 may get treatment or care as soon as possible. For example, the intended destination may be nearest medical establishment, or other places where the passenger 130 can be treated as soon as possible. In other embodiments, the intended destination may also be the residence of the passenger 130. In the meantime, the computer device 120 may also control the vehicle 110 to become an "ambulance", for example, alert the nearby vehicles using horns and warning lights, and speed up to the medical establishment. In this case, the vehicle 110 may still obey traffic laws, and if the other vehicles do not give way under the warning of the vehicle 110, the vehicle 110 may drive normally and wait.

In addition, if the passenger 130 experiences the physical discomfort and the vehicle 110 takes corresponding driving action, it may be advantageous to indicate the sudden physical discomfort of the passenger 130 or indicate the driving action performed thereby to the outside of the vehicle 110. Thus, in some embodiments, the computer device 120 may also provide the alert message associated with the physical discomfort event of the passenger 130 via various alert devices, to indicate the physical discomfort event of the passenger 130, the severity degree of the physical discomfort, the driving action performed correspondingly and other related information. For example, the computer device 120 may display words and images via the display screen provided on the vehicle body of the vehicle 110, and may also control the horn (or microphone) of the vehicle 110 to whistle, and may also control the lights of the vehicle 110 to send out light signals.

In this way, other traffic participants or regulators may notice and know the situation in the vehicle 110, to take corresponding action. For example, other vehicles driving around the vehicle 110 may yield to the vehicle 110 reasonably. For another example, after the vehicle 110 issues the alert message that the passenger 130 experiences severe physical discomfort, the regulators may inform or contact the medical establishment in time, such that the medical establishment may prepare receiving the sick passenger sent by the vehicle 110, or may go to the position where the vehicle 110 is actively to treat and cure the passenger 130.

Figure 3A:
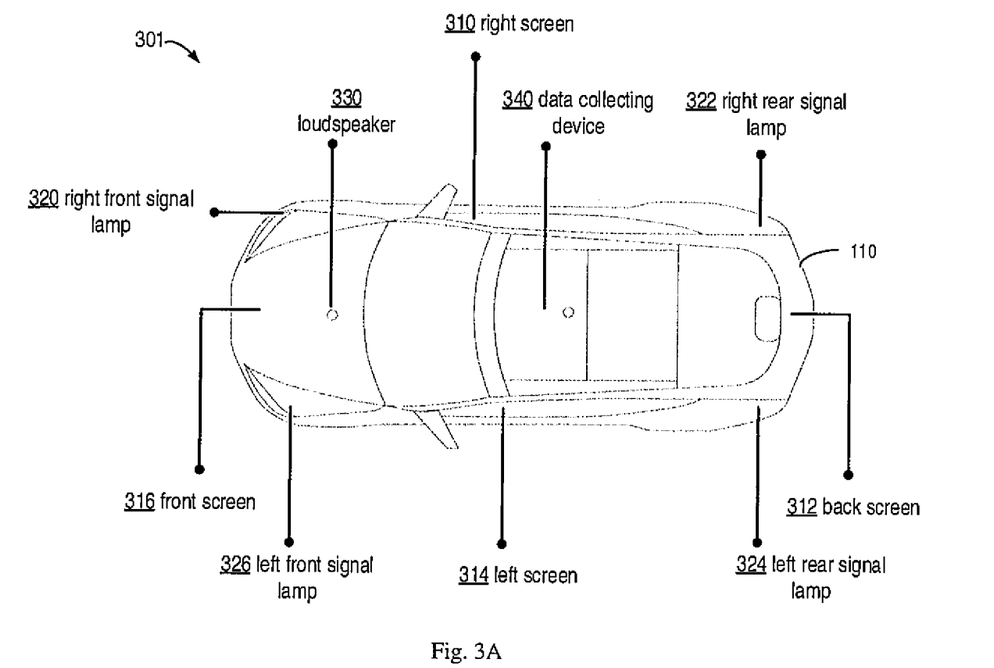
FIG. 3A is a top view of an exemplary vehicle according to some embodiments of the present disclosure.

The specific content and display manner of the alert message may depend on specific hardware configuration of the vehicle 110. An example of the hardware configuration of the vehicle 110 is illustrated below with reference to FIG. 3A to FIG. 3C. FIG. 3A depicts a top view 301 of an example of the vehicle 110. In this example, the vehicle 110 includes one or more display screens installed on the outside of the vehicle 110. The display screens may include a left screen 310 and a right screen 314 installed on the sides of the vehicle 110, a back screen 312 installed at the back of the vehicle 110, and a front screen 316 installed at the front of the vehicle 110. The back screen 312 may be more clearly shown in the rear view of the vehicle 110 depicted in FIG. 3B. The display screen may be any type of screen that can feed back information in a form of words, image, and/or animation. In addition to the screens shown in FIG. 3A or as an alternative, one or more other screens may be installed at other positions of the vehicle 110.

As also can be seen from the top view 301 in FIG. 3A, the vehicle 110 may further include one or more signal lamps for emitting lights. The signal lamps may be positioned at different positions of the vehicle 110. For example, FIG. 3A shows a right front signal lamp 320, a right rear signal lamp 322, a left rear signal lamp 324 and a left front signal lamp 326. The signal lamps 320, 322, 324 and 326 may be for example, ray lamps. The vehicle 110 may further include other types of light. For example, FIG. 3C depicts a side view 303 of the vehicle 110. It can be seen from the side view 303, in addition to the side screens (for example, the left screen 310), the vehicle may further include a streamlined light strip installed on the side of the vehicle 110. The signal lamps including the ray lamps and the light strip may be any type of lamps that can output the feedback information in a form of light.

The vehicle 110 may further include one or more loudspeakers. Return back to FIG. 3A, which depicts a loudspeaker 330 positioned at the front of the vehicle 110. It should be understood that, one or more other loudspeakers may be positioned at other positions of the vehicle 110. The loudspeaker 330 may be configured to output feedback information in an audible form.

In addition to the device for information output, the vehicle 110 may further include one or more devices for collecting data outside the vehicle, for example, the data collecting device 340 at the top of the vehicle 110. The data collecting device 340 may be an image capturing device, for example a camera, and/or other types of sensors that can be configured to sense data. It should also be understood, one or more other data collecting devices may be positioned at other positions of the vehicle 110.

Figure 3B:
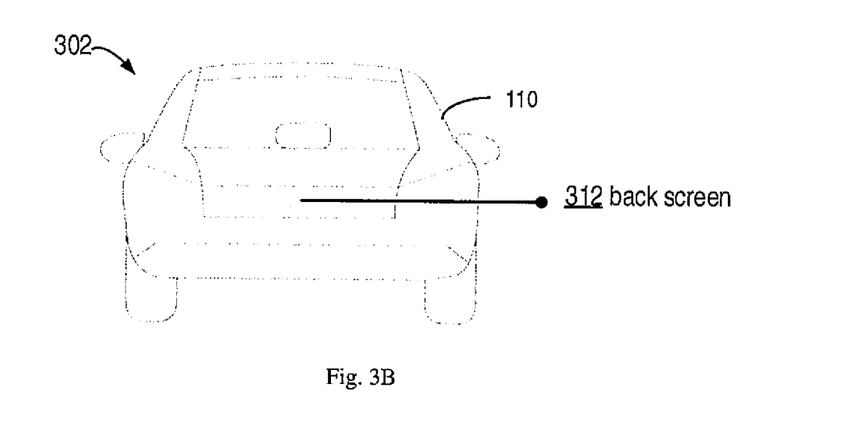
FIG. 3B is a rear view of an exemplary vehicle according to some embodiments of the present disclosure.
Figure 3C:
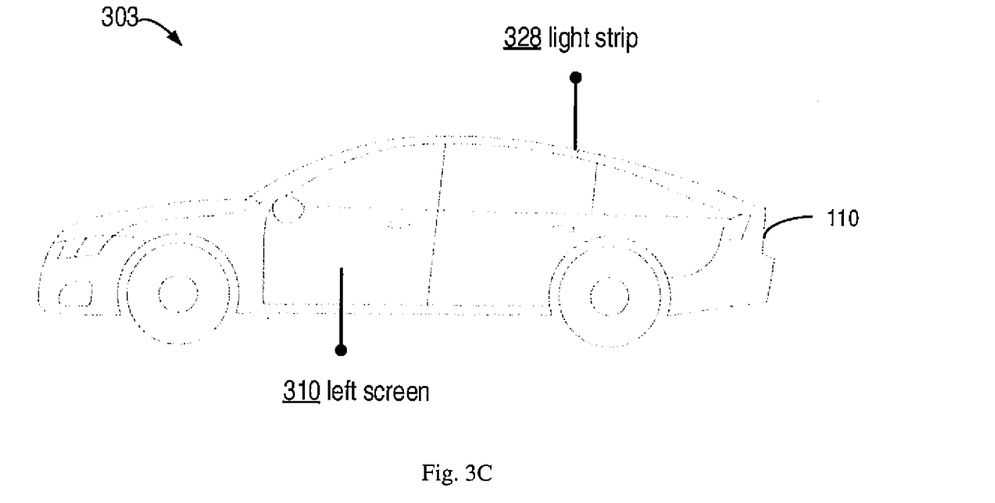
FIG. 3C is a side view of an exemplary vehicle according to some embodiments of the present disclosure.

The example of hardware configuration of the vehicle 110 is depicted above with reference to FIG. 3A to FIG. 3C. However, depending on the type and specific configuration of the vehicle 110, the type, number and configuration manner of the hardware devices used for feedback information outputting and data collecting may vary. Embodiments of the present disclosure are not limited in this respect. In the following, different manners in which the vehicle 110 displays the alert messages under different severity degrees of the physical discomfort of the passenger 130 are described in combination with FIG. 4A to FIG. 4C.

Figure 4A:
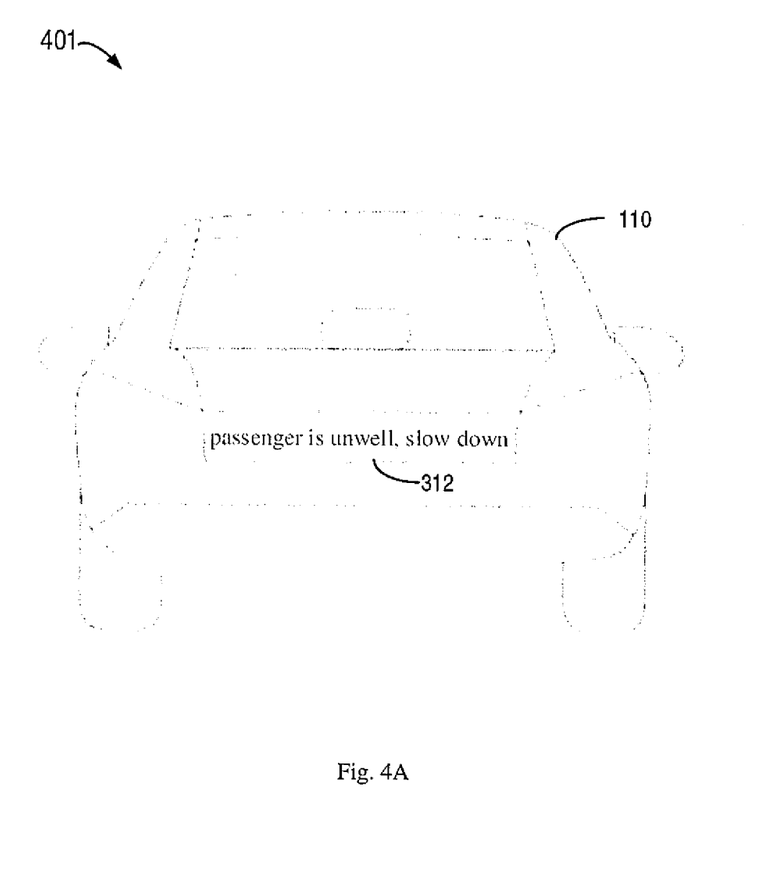
FIG. 4A is a schematic diagram of displaying an alarm message under a condition in which a passenger experiences little discomfort according to some embodiments of the present disclosure.
Figure 4B:
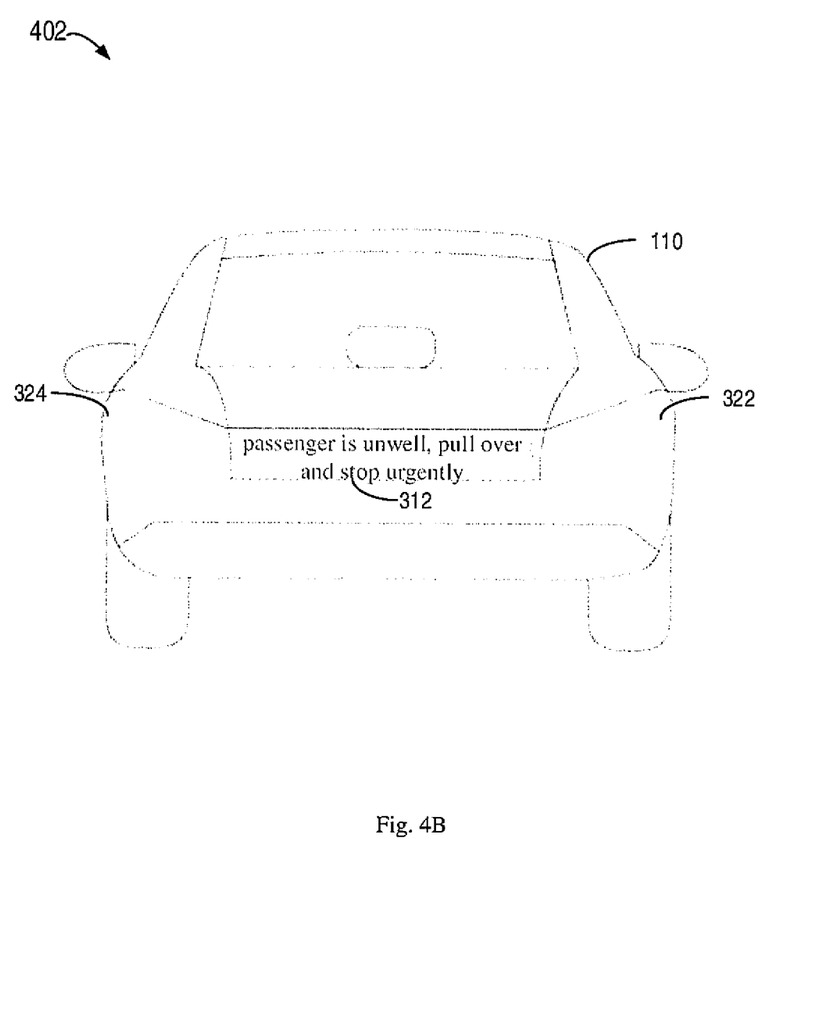
FIG. 4B is a schematic diagram of displaying an alarm message under a condition in which a passenger experiences moderate discomfort according to some embodiments of the present disclosure.
Figure 4C:
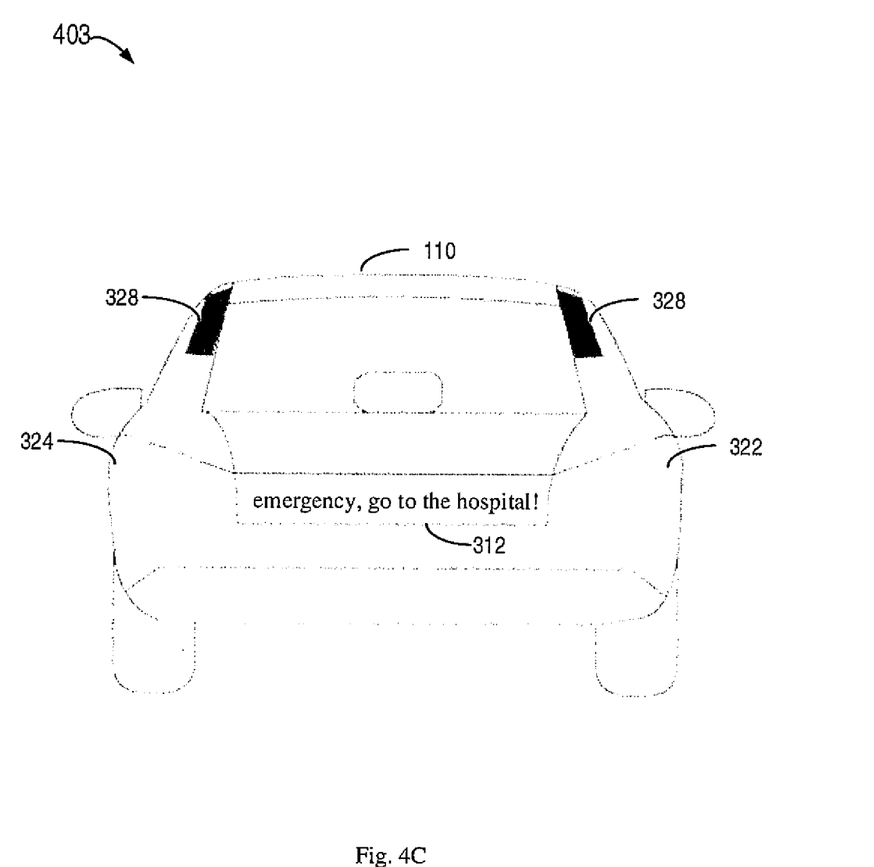
FIG. 4C is a schematic diagram of displaying an alarm message under a condition in which a passenger experiences severe discomfort according to some embodiments of the present disclosure.

FIG. 4A illustrates a schematic diagram 401 of displaying an alarm message under a condition in which the passenger 130 experiences little discomfort according to some embodiments of the present disclosure. FIG. 4B illustrates a schematic diagram 402 of displaying an alarm message under a condition in which the passenger 130 experiences moderate discomfort according to some embodiments of the present disclosure. FIG. 4C illustrates a schematic diagram 403 of displaying an alarm message under a condition in which the passenger 130 experiences severe discomfort according to some embodiments of the present disclosure.

As illustrated in FIG. 4A, in the case of slight physical discomfort of the passenger 130, the display screen 312 on the body of the vehicle 110 may display the words "passenger is unwell, slow down" or relevant graphics, and the vehicle 110 may whistle to alert the surrounding vehicles. As illustrated in FIG. 4B, in the case of moderate physical discomfort of the passenger 130, the display screen 312 on the body of the vehicle 110 may display the words "passenger is unwell, pull over and stop urgently" or relevant graphics. The right rear signal lamp 322 and the left rear signal lamp 324 may give out the double flashing indicator light signal, and the vehicle 110 may also whistle to alert the surrounding vehicles. As illustrated in FIG. 4C, the display screen 312 on the body of the vehicle 110 may display "emergency, go to the hospital!" or relevant graphics, and at the same time, the right rear signal lamp 322 and the left rear signal lamp 324 will issue a double-flashing signal, the light strip (for example, red light strip) equipped at the top of the vehicle will flash, and the vehicle loudspeaker 330 will whistle intermittently in a continuous time period to simulate "ambulance".

Figure 5:
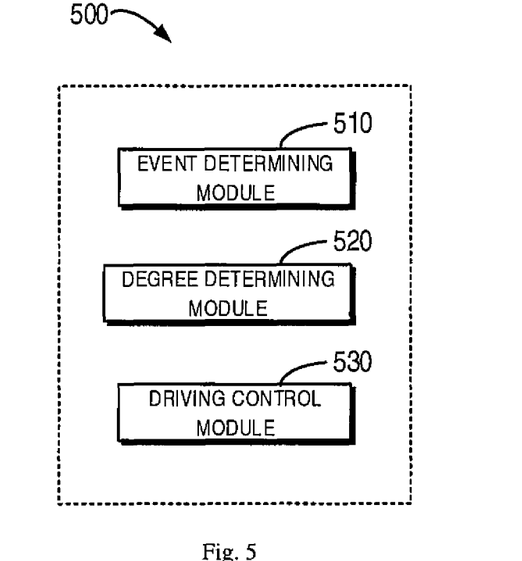
FIG. 5 is a block diagram of an apparatus for controlling an unmanned vehicle according to an embodiment of the present disclosure.

FIG. 5 illustrates a schematic block diagram of an apparatus 500 for controlling an unmanned vehicle according to embodiments of the present disclosure. In some embodiments, the apparatus 500 may be included in the computer device 120 of FIG. 1 or may be implemented as the computer device 120.

As illustrated in FIG. 5, the apparatus 500 includes an event determining module 510, a degree determining module 520, and a driving control module 530. The event determining module 510 is configured to determine occurrence of an event associated with physical discomfort of a passenger in the vehicle. The degree determining module 520 is configured to determine a severity degree of the physical discomfort of the passenger. The driving control module 530 is configured to control a driving action of the vehicle based on the determined severity degree.

In some embodiments, the event determining module 510 includes an image acquiring sub-module, a behavior determining sub-module and a first event determining sub-module. The image acquiring sub-module is configured to acquire an image containing the passenger, in which the image is determined from pictures shot for the passenger or frames in a video streaming shot for the passenger. The behavior determining sub-module is configured to determine a behavior of the passenger based on the image, in which the behavior of the passenger comprises at least one of facial expression and body movement of the passenger. The first event determining sub-module is configured to determine the occurrence of the event associated with physical discomfort of the passenger in the vehicle in response to matching of the determined behavior and a predetermined physical discomfort behavior.

In some embodiments, the degree determining module 520 includes a level determining sub-module and a first degree determining sub-module. The level determining sub-module is configured to determine a level corresponding to the matched predetermined physical discomfort behavior. The first degree determining sub-module is configured to determine the severity degree of the physical discomfort of the passenger based on the level determined.

In some embodiments, the event determining module 510 includes a keyword identifying sub-module and a second event determining sub-module. The keyword identifying sub-module is configured to identify keywords in a voice of the passenger. The second event determining sub-module is configured to determine the occurrence of the event associated with the physical discomfort of the passenger in response to detecting words expressing the physical discomfort in the keywords.

In some embodiments, the degree determining module 520 includes an advert of degree determining sub-module and a second degree determining sub-module. The adverb of degree determining sub-module is configured to determine an adverb of degree in the words expressing the physical discomfort. The second degree determining sub-module is configured to determine the severity degree based on the adverb of degree.

In some embodiments, the driving control module 530 includes at least one of a first driving control sub-module, a second driving control sub-module and a third driving control sub-module. The first driving control sub-module is configured to control the vehicle to slow down in response to the severity degree being slight. The second driving control sub-module is configured to control the vehicle to pull over in response to the severity degree being moderate. The third driving control sub-module is configured to control the vehicle to drive to a predetermined destination in response to the severity degree being severe.

In some embodiments, the apparatus 500 further includes a providing module. The providing module is configured to provide an alert message associated with the event, to indicate at least one of the event, the severity degree and the driving action.

In some embodiments, the providing module includes at least one of a text display module, an image display module, a whistling module, and a light signal issuing module.

Figure 6:
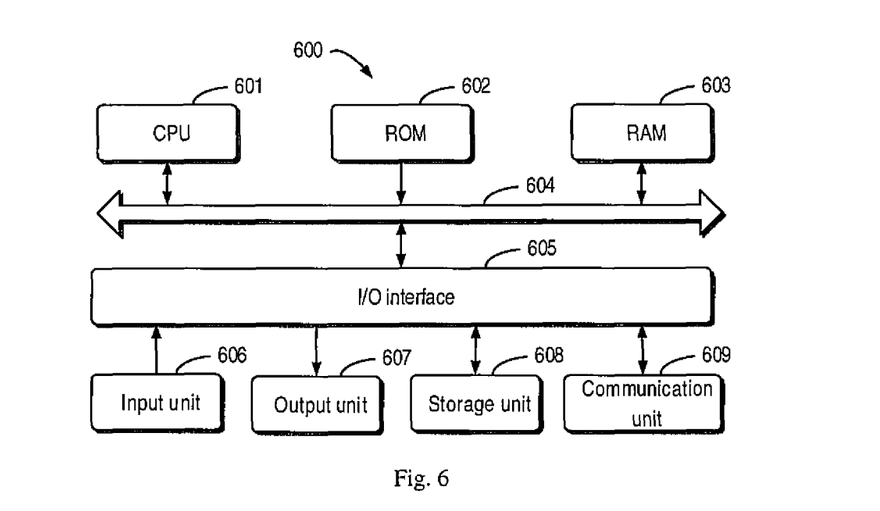
FIG. 6 is a block diagram of a device that can be configured to implement embodiments of the present disclosure.

FIG. 6 illustrates a block diagram of an exemplary device 600 suitable for implementing embodiments of the present disclosure. As illustrated in FIG. 6, the device 600 includes a central processing unit (CPU) 601 that can perform various appropriate actions and processes based on computer program instructions stored in the read only memory (ROM) 602 or computer program instructions loaded from the memory unit 608 into the random access memory (RAM) 603. In RAM 603, various programs and data needed for the operation of the device 600 may also be stored. The CPU 601, ROM 602, and RAM 603 are connected to each other via the bus 604. The input/output (110) interface 605 is also connected to the bus 804.

Multiple components of the device 800 are connected to the I/O interface 605, including: the input unit 606, such as keyboard, mouse, etc.; the output unit 607, such as various types of monitors, speakers, etc.; storage unit 608, such as disk, CD, etc; and the communication unit 609, such as network cards, modems, wireless transceiver, etc. The communication unit 609 allows the device 600 to exchange information/data with other devices via the computer network such as Internet and/or various telecommunication networks.

The processing unit 601 performs the various methods and processes described above, such as the method 200. For example, in some embodiments, the method 200 may be implemented as a computer software program that is physically contained in machine-readable media, such as storage unit 608. In some embodiments, part or all of a computer program may be loaded and/or installed onto the device 600 via the ROM 602 and/or the communication unit 609. When the computer program is loaded into the RAM 603 and executed by the CPU 601, one or more steps of any of the method 200 described above can be executed.

As used herein, the term "including" and similar terms shall be interpreted as open inclusion, namely, "including but not limited to". The term "based on" should be understood as "at least partially based on". The term "an embodiment" or "such embodiment" shall be understood as "at least one embodiment". The terms "first", "second" and so on may refer to different or identical objects. Other explicit and implicit definition may also be included herein.

As used herein, the term "determining" covers a variety of actions. For example, "determining" may include operations, calculations, processing, exports, surveys, lookups (for example, in a table, database, or another data structure), ascertainments, and so on. In addition, "determining" may include receiving (for example, receiving information), accessing (for example, accessing data in the storage), and so on. In addition, "determine" may include parsing, selecting, choosing, establishing, etc.

It should be noted that the embodiments of the present disclosure may be realized through hardware, software or a combination of software and hardware. The hardware portion may be realized by using special logic. The software portion may be stored in the memory and executed by an appropriate instruction execution system, such as a microprocessor or special designed hardware. Those skilled in the art may understand that the above apparatus and methods may be implemented by using computer-executable instructions and/or being contained in processor control codes, for example, such codes are provided in programmable memory or data carriers such as optical or electronic signal carriers.

Furthermore, although the operations are depicted in a particular order, this should be understood that the operations are required to be performed in a particular or sequential order as indicated, or that all the operations illustrated should be performed to achieve the desired result. Under certain circumstances, multitasking and parallel processing may be beneficial. Similarly, although some implementation details are included in the above discussion, these should not be interpreted as limiting the scope of the present disclosure. Certain characteristics described in the context of individual embodiments may also be combined and implemented in a single implementation. Conversely, the various characteristics described in the context of a single implementation may also be implemented individually or in any appropriate sub-combination in multiple implementations.

Although the subject has been described in language specific to the structural features and/or logical actions of the method, it should be understood that the subject defined in the attached claim is not necessarily limited to the specific features or actions described above. Instead, the specific features and actions described above are merely an example form of implementing the claims.

What is claimed is:

1. A method for controlling an unmanned vehicle, comprising:
   determining occurrence of an event associated with physical discomfort of a passenger in the vehicle;
   determining a severity degree of the physical discomfort of the passenger; and
   controlling a driving action of the vehicle based on the determined severity degree;
   wherein determining occurrence of the event associated with physical discomfort of the passenger in the vehicle comprises:
   identifying keywords in a voice of the passenger, wherein the keywords include words expressing the physical discomfort;
   determining an adverb of degree in the words expressing the physical discomfort; and
   determining the severity degree based on the adverb of degree.

2. The method of claim 1, wherein determining occurrence of the event associated with physical discomfort of the passenger in the vehicle comprises:
   acquiring an image containing the passenger, in which the image is determined from pictures shot for the passenger or frames in a video streaming shot for the passenger;
   determining a behavior of the passenger based on the image, in which the behavior of the passenger comprises at least one of facial expression and body movement of the passenger; and
   determining the occurrence of the event associated with physical discomfort of the passenger in the vehicle in response to matching of the determined behavior and a predetermined physical discomfort behavior.

3. The method of claim 2, wherein determining the severity degree of the physical discomfort of the passenger comprises:
   determining a level corresponding to the matched predetermined physical discomfort behavior; and
   determining the severity degree of the physical discomfort of the passenger based on the level determined.

4. The method of claim 1, wherein determining occurrence of the event associated with physical discomfort of the passenger in the vehicle comprises:
   determining the occurrence of the event associated with the physical discomfort of the passenger in response to detecting the words expressing the physical discomfort in the keywords.

5. The method of claim 1, wherein controlling the driving action of the vehicle comprises at least one of:
   in response to the severity degree being slight, controlling the vehicle to slow down;
   in response to the severity degree being moderate, controlling the vehicle to pull over; and
   in response to the severity degree being severe, controlling the vehicle to drive to a predetermined destination.

6. The method of claim 1, further comprising:
   providing an alert message associated with the event via a display screen installed on a vehicle body of the unmanned vehicle, to indicate at least one of the event, the severity degree and the driving action.

7. The method of claim 6, wherein providing the alert message comprises at least one of displaying text, display images, whistling and issuing light signals.

8. An apparatus for controlling an unmanned vehicle, comprising:
   a processor; and
   a memory, configured to store instructions executable by the processor,
   wherein the processor is configured to run a program corresponding to the instructions by reading the instructions in the memory, so as to perform:
   determining occurrence of an event associated with physical discomfort of a passenger in the vehicle;
   determining a severity degree of the physical discomfort of the passenger; and
   controlling a driving action of the vehicle based on the determined severity degree;
   wherein the processor is further configured to:
   identify keywords in a voice of the passenger, wherein the keywords include words expressing the physical discomfort;
   determine an adverb of degree in the words expressing the physical discomfort; and
   determine the severity degree based on the adverb of degree.

9. The apparatus of claim 8, wherein the processor is configured to:
   acquire an image containing the passenger, in which the image is determined from pictures shot for the passenger or frames in a video streaming shot for the passenger;
   determine a behavior of the passenger based on the image, in which the behavior of the passenger comprises at least one of facial expression and body movement of the passenger; and
   determine the occurrence of the event associated with physical discomfort of the passenger in the vehicle in response to matching of the determined behavior and a predetermined physical discomfort behavior.

10. The apparatus of claim 9, wherein the processor is configured to:
    determine a level corresponding to the matched predetermined physical discomfort behavior; and
    determine the severity degree of the physical discomfort of the passenger based on the level determined.

11. The apparatus of claim 8, wherein the processor is configured to:
    determine the occurrence of the event associated with the physical discomfort of the passenger in response to detecting the words expressing the physical discomfort in the keywords.

12. The apparatus of claim 8, wherein the processor is configured to perform at least one of:
    controlling the vehicle to slow down in response to the severity degree being slight;
    controlling the vehicle to pull over in response to the severity degree being moderate; and
    controlling the vehicle to drive to a predetermined destination in response to the severity degree being severe.

13. The apparatus of claim 8, wherein the processor is further configured to:
    provide an alert message associated with the event via a display screen installed on a vehicle body of the unmanned vehicle, to indicate at least one of the event, the severity degree and the driving action.

14. The apparatus of claim 13, wherein the processor is configured to provide the alert message by displaying text, displaying images, whistling or issuing light signals.

15. A non-transitory computer readable storage medium, stored thereon with a computer program that, when executed by a processor, a method for controlling an unmanned vehicle is implemented, the method comprising:
    determining occurrence of an event associated with physical discomfort of a passenger in the vehicle;
    determining a severity degree of the physical discomfort of the passenger; and
    controlling a driving action of the vehicle based on the determined severity degree;
    wherein determining occurrence of the event associated with physical discomfort of the passenger in the vehicle comprises:
    identifying keywords in a voice of the passenger, wherein the keywords include words expressing the physical discomfort;
    determining an adverb of degree in the words expressing the physical discomfort; and
    determining the severity degree based on the adverb of degree.

* * * * *